A. E. WHITNEY.
SUPPLEMENTAL WHEEL FOR MOTOR CARS.
APPLICATION FILED JUNE 22, 1908.
936,750.
Patented Oct. 12, 1909.
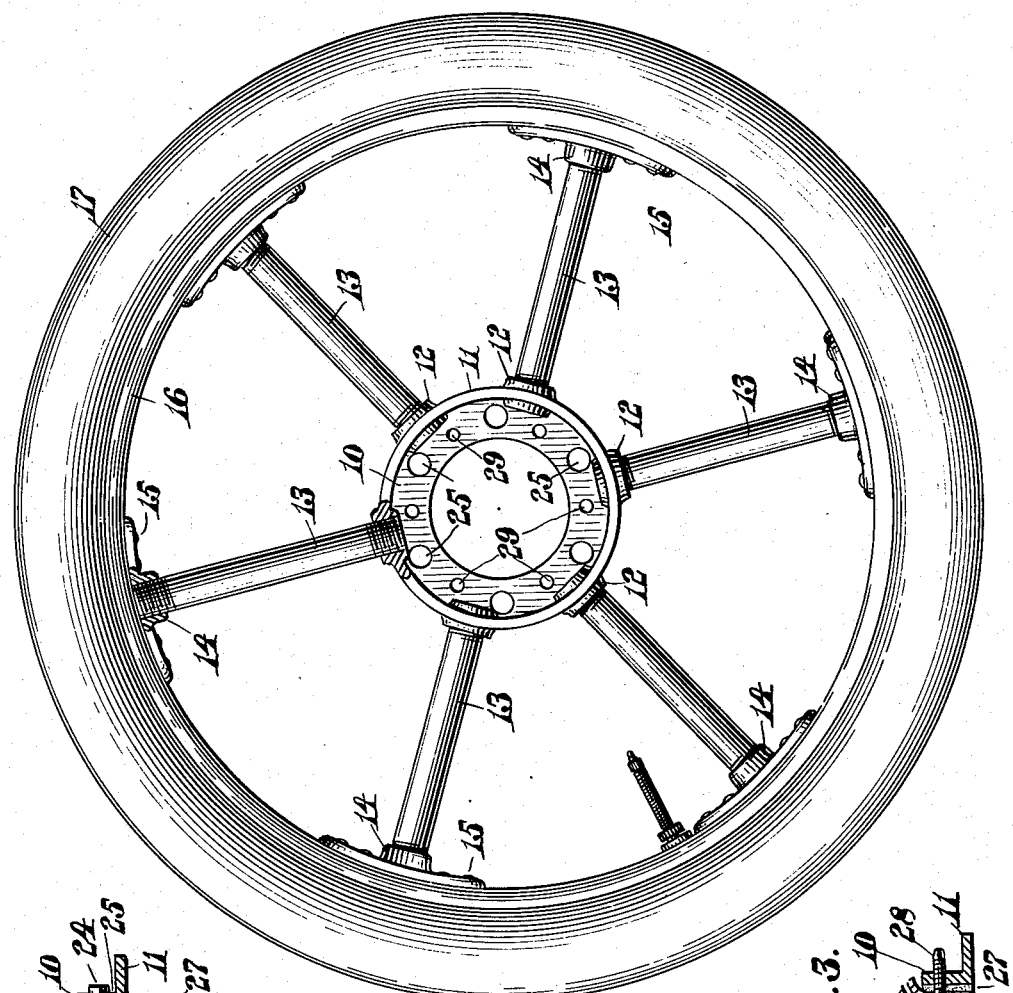
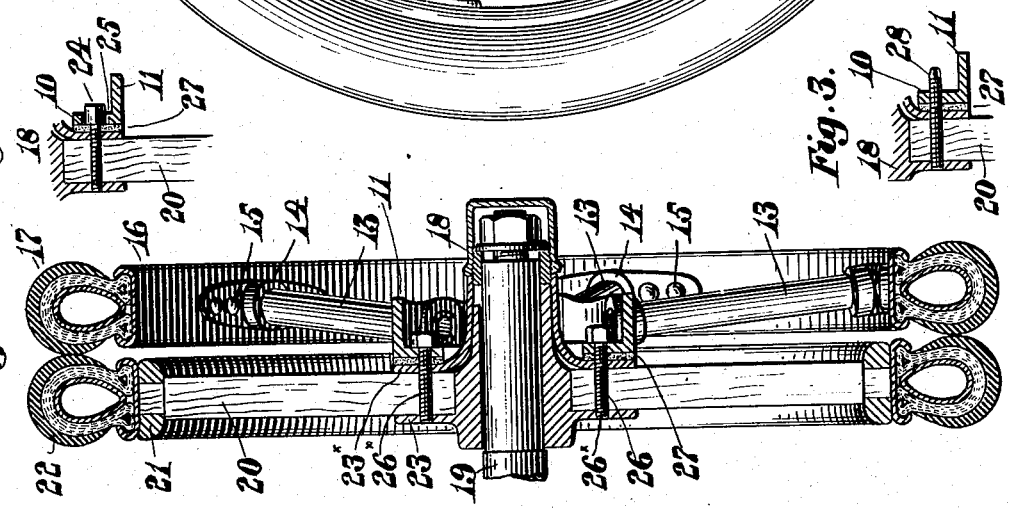
Witnesses:
Nathan C. Lombard
Edna E. Cleveland
Inventor:
Arthur E. Whitney,
by Walter E. Lombard.
Atty.

UNITED STATES PATENT OFFICE.

ARTHUR E. WHITNEY, OF WINCHESTER, MASSACHUSETTS.

SUPPLEMENTAL WHEEL FOR MOTOR-CARS.

936,750.

Specification of Letters Patent. Patented Oct. 12, 1909.

Application filed June 22, 1908. Serial No. 439,884.

*To all whom it may concern:*

Be it known that I, ARTHUR E. WHITNEY, a citizen of the United States of America, and a resident of Winchester, in the county of Middlesex and State of Massachusetts, have invented certain new and useful Improvements in Supplemental Wheels for Motor-Cars, of which the following is a specification.

This invention relates to supplemental wheels for use on motor cars to be used in connection with one of the supporting wheels of the car whenever a puncture or other injury occurs to such wheel.

Many devices have been constructed for quickly detaching a punctured tire and replacing it with an extra one carried on the car and a variety of devices have been constructed for repairing the puncture without removing the tire from the wheel. Moreover, in some cases extra wheels are carried which are adapted to replace either one of the wheels when any injury occurs thereto.

It has been found in practice that when a puncture occurs in the tire of one of the supporting wheels much time is consumed either in replacing the wheel by another wheel, removing the tire and adjusting an extra one to the wheel, or by repairing the puncture in the tire while the tire remains upon the wheel.

To avoid these many objections and provide a device which will dispense with the necessity of removing the injured wheel from the axle or the punctured tire from the wheel and make it possible to quickly attach a new or supplemental supporting wheel to the one placed out of commission, is the object of the present invention.

The invention consists in providing an extra or supplemental wheel which may be readily stored at any convenient point upon the carriage and which has an annular flanged central portion which is adapted to fit over the hub of one of the supporting wheels and to be secured to said hub in any well-known manner, the diameter of the extra wheel and that to which it is attached being the same.

The invention further consists in certain novel features of construction and arrangement of parts which will be readily understood by reference to the description of the drawings and to the claims hereinafter given.

Of the drawings: Figure 1 represents an elevation of the supplemental wheel embodying the features of this invention. Fig. 2 represents a section of the same shown secured to one of the supporting wheels of a motor car, and Figs. 3 and 4 represent details of construction to be hereinafter referred to.

Similar characters designate like parts throughout the several figures of the drawings.

In the drawings, 10 represents a central ring provided with an outwardly extending flange 11, said flange 11 being provided with a plurality of bosses 12 to each of which is threaded a tubular spoke 13 the opposite end of which is threaded to a boss 14 secured by rivets 15 to an annular rim 16 concentric with said ring 10. Secured to the rim 16 in any well-known manner is the usual tire 17.

18 represents the hub of one of the supporting wheels mounted upon the axle 19 and provided with a plurality of radial spokes 20 having at their outer ends an annular rim 21 supporting a tire 22 of usual construction, the diameter of which is the same as that of the diameter of the tire 17 on the supplemental wheel.

The flanges 23 and 23* of the hub 18 are secured together through the spokes 20 by means of bolts 24, the heads of which extend beyond the outer face of the flange 23*. The ring 10 is provided with a plurality of openings 25 of sufficient size to receive the heads of the bolts 24 when the supplemental wheel is placed in position. The flanges 23 and 23* are provided with a plurality of threaded holes 26 into which are adapted to be threaded the bolts 26* to secure the ring 10 to said flanges 23 and 23* so that the two wheels will turn together.

In order to prevent injury to the outer face of the flange 23 when the supplemental wheel is applied to the usual supporting wheel the inner face of the ring 10 is reinforced by a layer 27 of felt or any other similar soft material. When one of the tires of the usual supporting wheels becomes punctured, two or three registering studs 28 are inserted into the threaded holes 26 and then the supplemental wheel is placed upon these registering studs which studs extend through the smaller openings 29 in the ring 10. These studs accurately register the holes 26 and 29 so that they are in perfect alinement and the supplemental wheel is supported on the regular supporting wheel. Through each of the holes 29 not occupied by a registering stud 28 is then inserted a bolt 26* which is screwed into the hole 26 and thereby locks the two wheels together. As soon as bolts have been inserted into all of the holes 26 not occupied by a registering stud 28 these studs are removed and replaced by holding bolts 26*. This operation of applying the supplemental wheel to the regular supporting wheel occupies but a fraction of the time that it would take to remove one of these wheels and replace it with a new one or to replace the punctured tire by a fresh one. It is obvious that this is of great advantage as often it is absolutely essential that no time may be lost on a trip but that the occupant of the car should reach a given destination at a stated time. Moreover it does away with the necessity of the occupant of the car himself making repairs to which he is little accustomed, it being apparent that any novice may readily apply the supplemental wheel to the regular supporting wheel while it requires expert skill when a tire becomes punctured to remove it and apply a new one to the supporting rim in a satisfactory manner.

To remove one of the supporting wheels and replace it with another would require the use of a jack to support the axle at that point while the extra weight of a fifth supporting wheel would be very objectionable. In the present device the supplemental wheel is of skeleton structure comparatively light in weight in comparison with the supporting wheel to which it is secured but is sufficiently rigid when once secured to the flange of the supporting wheel.

It is believed that from the foregoing the operation of the invention and the many advantages thereof will be fully apparent without any further description.

Having thus described my invention, I claim:

1. A supplemental wheel for motor cars having a central flanged annular member provided with a cylindrical flange projecting therefrom at right angles to its outer face, a tire supporting rim, a yielding tire upon said rim, and a plurality of tubular spokes between said rim and the flange of said annular member and rigidly secured to said rim and flange, said annular member being provided with means for securing it to one of the supporting wheels of the car.

2. A supplemental wheel for motor cars having a central annular flanged member, said flange being provided with a plurality of bosses, a spoke threaded to each of said bosses, a tire supporting rim provided with bosses to each of which one of said spokes is threaded, and means for securing said annular member to one of the supporting wheels of the car.

3. A supplemental wheel for motor cars having a central annular flanged member provided with a plurality of openings through said member and adapted to register with similar threaded openings through the flange of the hub of a supporting wheel; a tire supporting rim; a plurality of spokes interposed between said rim and flanged member supporting said rim in a different plane to said flanged member; and a plurality of bolts extending through the openings in the flange to the hub of one of the supporting wheels of the car.

Signed by me at 7 Water st., Boston, Mass., this 19th day of June, 1908.

ARTHUR E. WHITNEY.

Witnesses:
WALTER E. LOMBARD,
EDNA C. CLEVELAND.